United States Patent
Gangel et al.

(10) Patent No.: US 11,506,187 B2
(45) Date of Patent: Nov. 22, 2022

(54) ASSEMBLY CONSISTING OF A TRANSFORMER TANK AND A NACELLE OF A WIND TURBINE

(71) Applicant: Siemens Energy Global GmbH & Co. KG, Munich (DE)

(72) Inventors: Jürgen Gangel, Weiz (AT); Dominic Trieb, Gleisdorf (AT); Franz Reitbauer, Weiz (AT)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/955,499

(22) PCT Filed: Dec. 6, 2018

(86) PCT No.: PCT/EP2018/083825
§ 371 (c)(1),
(2) Date: Jun. 18, 2020

(87) PCT Pub. No.: WO2019/121040
PCT Pub. Date: Jun. 27, 2019

(65) Prior Publication Data
US 2020/0332777 A1 Oct. 22, 2020

(30) Foreign Application Priority Data
Dec. 20, 2017 (DE) .............. 102017223323

(51) Int. Cl.
*F03D 80/80* (2016.01)
*F03D 80/60* (2016.01)

(52) U.S. Cl.
CPC .............. *F03D 80/82* (2016.05); *F03D 80/60* (2016.05); *F05B 2240/14* (2013.01); *F05B 2240/91* (2013.01); *F05B 2260/20* (2013.01)

(58) Field of Classification Search
CPC ...... F03D 80/82; F03D 80/60; F05B 2240/14; F05B 2240/91; F05B 2260/20
See application file for complete search history.

(56) References Cited

U.S. PATENT DOCUMENTS 1,677,350 A * 7/1928 Kleckner ................ H01F 27/04
174/559
2,941,171 A * 6/1960 Wiederkehr .......... H01F 27/266
336/92
(Continued)

FOREIGN PATENT DOCUMENTS

CN 201092937 7/2008
DE 102007062622 6/2009
(Continued)

OTHER PUBLICATIONS

PCT International Search Report dated Apr. 3, 2019 based on PCT/EP2018/083825 filed Dec. 6, 2018.
(Continued)

*Primary Examiner* — Sean Gugger
(74) *Attorney, Agent, or Firm* — Cozen O'Connor

(57) ABSTRACT

An assembly includes a transformer tank that is arranged in a nacelle of a wind turbine, wherein the transformer tank is configured to be filled with a gas or a liquid to cool the active part of the transformer and the active part is enclosed by the transformer tank in a liquid-tight or gas-tight manner, such that use of the transformer tank as a reinforcement or a bracing of the steel construction of the nacelle with as little additional material expenditure as possible for the transformer is facilitated by integrating the transformer tank into the mechanical support structure of the nacelle such that the transformer tank forms a part of the mechanical support structure of the nacelle and by providing at least one bracing in the interior of the transformer tank, where bracing con- (Continued)

nects mutually opposing wall regions of the transformer tank.

7 Claims, 1 Drawing Sheet

(56) References Cited

U.S. PATENT DOCUMENTS

| | | | | | |
|---|---|---|---|---|---|
| 3,168,777 | A | * | 2/1965 | De Ridder | B21C 23/14 |
| | | | | | 29/890.03 |
| 4,834,257 | A | * | 5/1989 | Book | H01F 27/02 |
| | | | | | 220/646 |
| 5,246,286 | A | * | 9/1993 | Huebschen | A47B 47/03 |
| | | | | | 312/249.8 |
| 2013/0058070 | A1 | * | 3/2013 | Gaard | H01F 27/321 |
| | | | | | 361/836 |

FOREIGN PATENT DOCUMENTS

| | | |
|---|---|---|
| DE | 202014004373 | 6/2014 |
| EP | 1101934 B1 | 1/2005 |
| EP | 2063119 | 5/2009 |
| EP | 2565445 | 3/2013 |

OTHER PUBLICATIONS

Office Action dated Aug. 2, 2021 issued in Chinese Patent Application No. 201880082536.9.

* cited by examiner

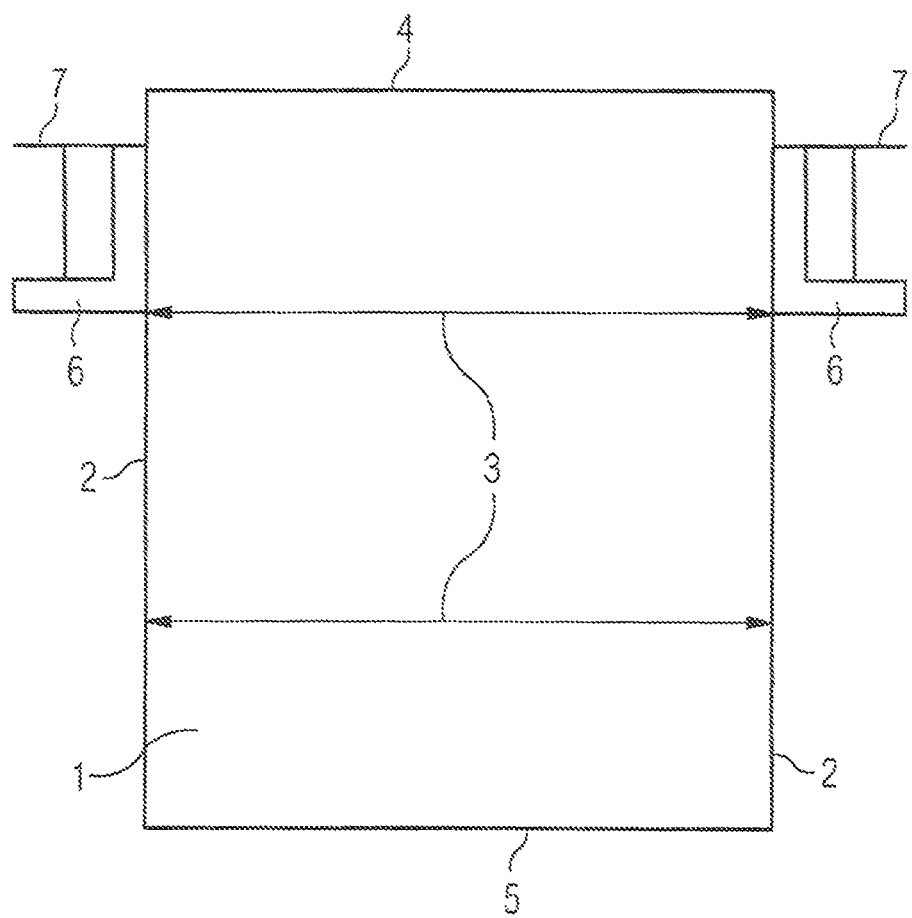

ASSEMBLY CONSISTING OF A TRANSFORMER TANK AND A NACELLE OF A WIND TURBINE

CROSS-REFERENCE TO RELATED APPLICATIONS

This is a U.S. national stage of application No. PCT/EP2018/083825 filed 6 Dec. 2018. Priority is claimed on German Application No. 10 2017 223 323.0 filed 20 Dec. 2017, the content of which is incorporated herein by reference in its entirety.

BACKGROUND OF THE INVENTION

1. Field of the Invention

The invention generally relates power transformers and, more particularly, to an arrangement comprising a transformer tank, which is arranged in a nacelle of a wind turbine, wherein the transformer tank is configured to be filled with a gas or a liquid to cool the active part of the transformer, where the active part is enclosed by the transformer tank in a liquid-tight or gas-tight manner in the operating state of the transformer. and where the arrangement in accordance with the invention may find use in various types of transformer, in particular in liquid-filled transformers.

The transformer used in the wind turbine comprises the transformer housing and the active part. The active part of a transformer comprises the windings of the transformer and the transformer core. In general, the active part in power transformers also comprises apparatuses that specify the position and/or the shape of the transformer core and/or of the windings, such as pressing apparatuses.

2. Description of the Related Art

A wind turbine comprises a tower, a nacelle fastened to the tower such that it is able to turn, as well as a rotor, where the nacelle carries the rotor, contains the drive train of the wind turbine as well as electrical installation parts of the wind turbine.

According to the prior art, for example, DE 20 2014 004 373 U1 discloses a transformer associated with the wind turbine that is situated in the nacelle or in the tower.

In principle, the transformer tank of the transformer serves to cool the active part of the transformer and serves as a container for the liquids and/or gases for cooling. Previously in wind turbines, the transformer tank did not have any function for carrying other constituent parts of the wind turbine. Efforts are being made to use the transformer tank as a reinforcing element in the mechanical structure of the nacelle. This mechanical structure is usually a steel structural design.

Previous proposals sought to reinforce the transformer tank itself, i.e., its walls, such that the transformer tank or its walls are themselves made more stable, by reinforcing them, for example, by designing them to be thicker than in a transformer that does not have to assume a carrying function. This, however, leads to the weight of the transformer tank being increased which, however, complicates the transportation of the transformer into the nacelle, for example.

SUMMARY OF THE INVENTION

In view of the foregoing, is therefore an object of the invention to provide an arrangement comprising a transformer tank, which is arranged in a nacelle of a wind turbine, which overcomes the disadvantages of the prior art and in particular makes it possible to use the transformer tank as a reinforcement or brace of the steel structural design of the nacelle with as little additional material outlay for the transformer as possible.

This and other objects and advantages are achieved in accordance with the invention by a winding arrangement comprising a transformer tank, which is arranged in a nacelle of a wind turbine, where the transformer tank is configured to be filled with a gas or a liquid to cool the active part of the transformer, where the active part is enclosed by the transformer tank in a liquid-tight or gas-tight manner. In this context, the transformer tank is inserted into the mechanical supporting structure of the nacelle such that the transformer tank forms part of the mechanical supporting structure of the nacelle and at least one brace is provided in the interior of the transformer tank, which connects mutually opposing wall regions of the transformer tank.

With one or more braces in the interior of the transformer tank, it is possible to increase the rigidity of the transformer tank in a simple manner and with comparatively little material outlay, without having to design the walls of the transformer tank in a more solid way.

The term "wall regions of the transformer tank" includes either limited wall regions such as the base, the lid and the individual side walls of the transformer tank. The transformer tank generally has a substantially cuboid-shaped construction.

In the operating state, the base and the lid are oriented in parallel with the contact surface in the nacelle, with the—in particular four—side walls (or one side wall surrounding in the form of a sheath, when the transformer tank is not embodied in the shape of a cuboid) normal to the contact surface. A wall region of the transformer tank, however, may also be a region of the side wall in the case of a side wall surrounding in the form of a sheath.

It can thus be provided that the mutually opposing wall regions, which are interconnected via one or more braces, are mutually opposing side walls or mutually opposing wall regions of a surrounding side wall. It is not excluded, however, that braces are also provided between the base and lid of the transformer tank.

In an advantageous embodiment of the invention, the brace is formed at least partially (in particular in relation to its longitudinal extension) as a straight beam. The brace may be fully or partially formed as a profiled steel beam, for example.

In another advantageous embodiment variant of the invention, at least two opposing wall regions of the transformer tank are connected to the mechanical supporting structure of the nacelle in a fixed manner. Here, the brace is connected to the wall of the transformer tank at the point where the wall of the transformer tank is connected to the mechanical supporting structure of the nacelle.

The braces can be produced with particularly little material outlay if at least part of the brace is formed by the active part of the transformer. Structural components of the active part that are not mechanically connected to a wall of the transformer tank can therefore be connected to additional connecting elements, which then establish a connection to the walls of the transformer housing, where the component of the active part forms the brace together with the additional connecting elements. The additional connecting elements may be formed as steel beams, for example.

In particular, it may be provided that part of the brace is formed by a component of a pressing structure of the transformer core. If the transformer core is constructed from individual sheets, then these are pressed together with end plates or end carriers which are interconnected by tensioners. These end plates or end carriers, e.g., profiled beams, may form part of the brace in accordance with the disclosed embodiments of the invention.

As an alternative or in addition, part of the brace is may be formed by a component of a pressing structure for the windings. In order to hold the windings in a defined position during the transportation and operation of the transformer, the windings are pressed together in parallel with their winding axis using end plates or end carriers arranged in an opposing manner, which are interconnected by tensioners. These end plates or end carriers, e.g., profiled beams, may form part of the brace in accordance with the disclosed embodiments of the invention.

When using components of an existing pressing structure, this means that there is no need to use additional braces, e.g., beams, which themselves connect a wall of the transformer tank to an opposing wall of the transformer tank, but rather it is sufficient if the components are extended on both sides, e.g., via carrier parts, and these extensions are connected to the walls or wall regions of the transformer tank.

It should be understand a transformer provided with one or more braces in accordance with the disclosed embodiments of the invention in its interior may also assume a carrying function in other mechanical supporting structures.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To further explain the invention, reference is made in the following part of the description to the schematic FIGURE, from which further advantageous details and possible areas of application of the invention can be inferred. The FIGURE is to be regarded as exemplary and is intended to illustrate the character of the invention, but does not in any way restrict it or represent it conclusively, in which:

The FIGURE shows a longitudinal section through an arrangement in accordance with the invention.

DETAILED DESCRIPTION OF THE EXEMPLARY EMBODIMENTS

The FIGURE shows a longitudinal section through a cuboid-shaped transformer tank 1. The active part of the transformer is not included. The two visible walls are mutually opposing side walls 2 of the transformer tank 1. Drawn between the side walls 2 are two straight braces 3, of which one is arranged closer to the lid 4 of the transformer tank 1 and one is arranged closer to the base 5 of the transformer tank 1. At the points where the upper brace 3 is connected to the side walls 2, a connecting element 6, such as a rail, which extends normal to the drawing plane is attached to the outer side of the side walls 2. This connecting element 6 serves to connect to the mechanical supporting structure 7 of the nacelle. The connecting element 6 is connected to the side wall 2 at the point at which the upper brace 3 is connected to the inner side of the side wall 2.

It should be understood further braces 3 (in particular coinciding with the two braces 3 shown) can be arranged in front of and/or behind the sectional plane in the transformer tank 1.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An arrangement comprising:
    a transformer tank, which is arranged in a nacelle of a wind turbine, the transformer tank being configured to be filled with one of (i) a gas and (ii) a liquid to cool an active part of the transformer; and
    a plurality of braces within an interior of the transformer tank, which extend across an entirety of the interior of the transformer tank and which connect mutually opposing external wall regions of the transformer tank; and
    a respective connecting element located at each respective end of an upper brace of the plurality of braces at an outer side of the mutually opposing external wall regions of the transformer tank;
    wherein the active part of the transformer is enclosed by the transformer tank in one of (i) a liquid-tight and (ii) gas-tight manner; and
    wherein the transformer tank is inserted into a mechanical supporting structure of the nacelle such that the transformer tank forms part of the mechanical supporting structure of the nacelle.

2. The arrangement as claimed in claim 1, wherein the mutually opposing external wall regions are mutually opposing side walls or mutually opposing external wall regions of a surrounding side wall.

3. The arrangement as claimed in claim 1, wherein each brace of the plurality of braces is at least partially formed as a straight beam.

4. The arrangement as claimed in claim 2, wherein each brace of the plurality of braces is at least partially formed as a straight beam.

5. The arrangement as claimed in claim 1, wherein at least two opposing wall regions of the mutually opposing external wall regions of the transformer tank are connected to the mechanical supporting structure of the nacelle in a fixed manner.

6. The arrangement as claimed in claim 1, wherein each brace of the plurality of braces is connected to a wall of the transformer tank at a point at which the wall of the transformer tank is connected to the mechanical supporting structure of the nacelle.

7. The arrangement as claimed in claim 1, wherein part of each brace of the plurality of braces is formed by a component of a pressing structure of the transformer core.

* * * * *